United States Patent [19]

Marutiak

[11] Patent Number: 5,568,546
[45] Date of Patent: Oct. 22, 1996

[54] METHOD AND APPARATUS FOR DYNAMIC ABBREVIATED DIALING ASSIGNMENT

[75] Inventor: David J. Marutiak, Oakland, Calif.

[73] Assignee: Lucent Technologies, Inc., Murray Hill, N.J.

[21] Appl. No.: 331,829

[22] Filed: Oct. 31, 1994

[51] Int. Cl.$^6$ .................................................. H04M 1/27
[52] U.S. Cl. ........................ 379/355; 379/354; 379/356; 379/357
[58] Field of Search .................... 379/355, 354, 379/356, 357, 216, 288, 280, 130, 131, 140, 141, 40

[56] References Cited

U.S. PATENT DOCUMENTS

| | | | |
|---|---|---|---|
| 4,908,853 | 3/1990 | Matsumoto | 379/355 |
| 5,034,976 | 7/1991 | Sato | 379/113 |
| 5,208,683 | 5/1993 | Okada | 358/468 |
| 5,216,705 | 6/1993 | Yoshida et al. | 379/100 |
| 5,241,403 | 8/1993 | Ishikawa et al. | 358/440 |
| 5,241,586 | 8/1993 | Wilson et al. | 379/130 |
| 5,267,308 | 11/1993 | Jokinen et al. | 379/354 |
| 5,357,564 | 10/1994 | Gupta et al. | 379/196 |
| 5,375,124 | 12/1994 | D'Ambrogio et al. | 379/284 |
| 5,412,709 | 5/1995 | Jarvis et al. | 379/210 |
| 5,422,936 | 6/1995 | Atwell | 379/211 |

*Primary Examiner*—Krista M. Zele
*Assistant Examiner*—Jacques M. Saint-Surin
*Attorney, Agent, or Firm*—Jack R. Penrod

[57] ABSTRACT

A method and apparatus for automatically and dynamically determining a list of frequently called telephone numbers for abbreviated dialing or speed dialing. The method and apparatus maintain a list of each telephone number dialed, either manually or by abbreviated dialing, over a period of time. This list is periodically updated to remove infrequently used telephone numbers. The list is also sorted such that the most frequently used telephone numbers will be displayed as a top set or page thereof. The apparatus includes a telephone set which has multiple display areas where one set or page of telephone numbers available for abbreviated dialing is displayed. Each display area is associated with and adjacent to a respective switch. A paging switch which causes the display of one or more subsequent sets or pages of the abbreviated dialing list may also be included. To make a telephone call using the abbreviated dialing apparatus, the user actuates the switch adjacent to the display area displaying the frequently dialed number or a label (name) corresponding to the frequently dialed number. From that switch actuation, the apparatus will read the corresponding number to be dialed from memory and automatically dial the number. This abbreviated dialing list is self starting and self maintaining, the user never needs to personally 'program' the telephone set.

4 Claims, 4 Drawing Sheets

METHOD AND APPARATUS FOR DYNAMIC ABBREVIATED DIALING ASSIGNMENT

TECHNICAL FIELD

The invention relates to telecommunication equipment and more particularly to a method and apparatus for abbreviated dialing in such equipment.

DESCRIPTION OF THE PRIOR ART

Abbreviated dialing, also know as speed dialing or speed calling, has been available in telecommunications equipment for many years. Known abbreviated dialing methods and devices require the abbreviated dialing numbers or keys be predetermined by first having the user enter a list of associated dialed numbers (DNs) into some type of storage. After such entry, depressing the abbreviated dialing numbers or switches representing the position of a DN on the predetermined list causes the corresponding DN to be dialed. Some examples of such systems are disclosed in U.S. Pat. No. 5,241,403 issued to Ishikawa for abbreviated dialing for a facsimile machine; U.S. Pat. No. 5,216,705 issued to Yoshida et al. for abbreviated dialing for a data communication apparatus; and U.S. Pat. No. 5,208,683 issued to Okada for abbreviated dialing for a telecommunications call processing device. The main problems with such equipment using predetermined lists of abbreviated dialing numbers are that commonly used numbers do change, and commonly used numbers change at such a sufficiently slow rate that the user must open the operator's manual and re-learn the method for programming the predetermined DNs every time an updating, addition, or deletion change occurs. This situation is borne out by the number of abbreviated dialing units that have out-of-date, invalid numbers still programmed to some of the abbreviated dialing keys.

Solution

The aforementioned problems are solved and an advance in the art is achieved by providing a method for dynamically determining and programming an abbreviated dialing list of commonly dialed numbers. The method stores each dialed number that is dialed by either by an abbreviated dialing action or by manually entering each digit until a limit of storage is attained. Thus a list of DNs that are actually used is stored. A count of the number of uses of each DN on the list is associated with each DN, respectively, and stored. Also, a date of the last usage of each DN is associated with each DN and stored. This information is sorted to provide a list of DNs with the most used DN assigned to the first ranking on the list and the remainder of the DNs following in descending order of use. If there are ties for a ranking on the list, the DN that was used most recently is assigned the higher ranking. The top most rankings of this dynamically updated list are displayed at the user's telephone station whenever the handset goes off-hook. If the capacity to store DNs has been reached and a new DN is manually dialed, the lowest ranking DN on the list is replaced by the new manually dialed DN. Since it may be difficult for a new DN to rise out of the lowest ranking, the method may include providing a newly entered DN with a grace period, such as seven days, during which it is protected and cannot be removed from the list. In such a case if the capacity has been attained, a new manually entered DN would replace the DN with the lowest ranking non-protected ranking. After displaying the topmost rankings of the list, the remainder of the list may be paged through in order to display and present for use more DNs of the dynamically determined abbreviated dialing list. Thus, the telephone station is provided with a dynamically updated abbreviated dialing list that corresponds to the DNs most frequently dialed from the telephone station.

In another aspect of the invention, the aforementioned problem is solved by providing an apparatus for dynamically determining an abbreviated dialing list of commonly dialed numbers. The apparatus stores each dialed number that is dialed, either by an abbreviated dialing action or by manually actuating each digit, until a limit of storage is attained. Thus a list of dialed numbers that are actually used is stored. A count of the number of uses of each DN on the list is associated with each DN, respectively, and stored. Also, a date of the last usage of each DN is associated with each DN and stored. The apparatus sorts this information to derive a list of DNs with the most used DN assigned to the first ranking on the list and the remainder of the DNs following in descending order of use. The top most rankings of this dynamically updated list are displayed on a telephone station with a display capability. A DN is selected from the list for abbreviated dialing by actuating a switch associated with a respective display of a DN of the abbreviated dialing list. Thus, the apparatus, which includes a telephone station, is provided with a dynamically updated abbreviated dialing list that corresponds to the DNs most frequently dialed, automatically, without special user entry operations.

DETAILED DESCRIPTION

Figure 1:
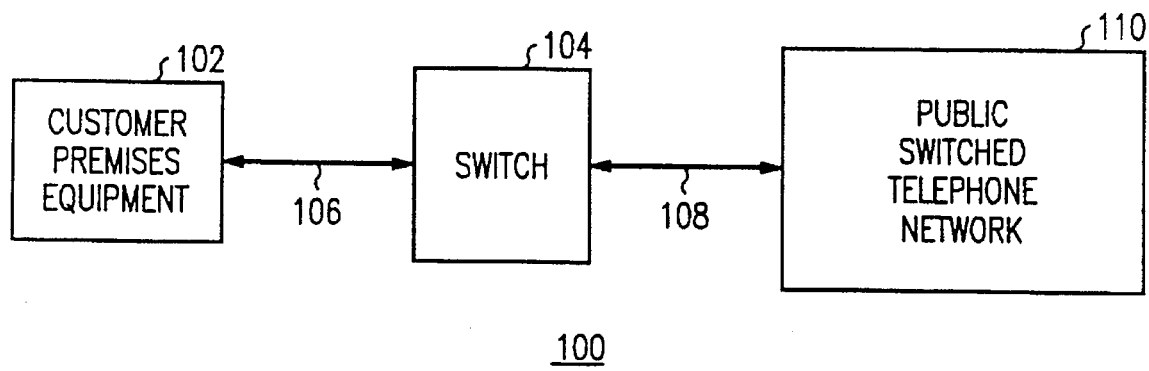
FIG. 1 is a block diagram of a telephone station and a telecommunication switch, in which aspects of the invention may be located and practiced.

Referring to FIG. 1, a general block diagram of an apparatus 100 for determining an abbreviated dialing list according to the present invention is shown. Apparatus 100 includes customer premises equipment (CPE) 102 and a telecommunications switch 104 which are connected together by bi-directional line 106. Telecommunications switch 104 may be a type 5ESS™ switch manufactured by AT&T Corp. located in New York, N.Y. A type 5ESS is described in U.S. Pat. No. 4,382,294 entitled "Telephone Switching Control Arrangement," by Beuscher, et al. This patent is commonly assigned to the assignee of the present invention, and is hereby incorporated by reference. The telecommunication switch 104 of apparatus 100 is connected by trunk 108 to a public switching transmission network 110 through which connections to similar switches or devices (not shown) may be made.

Figure 2:
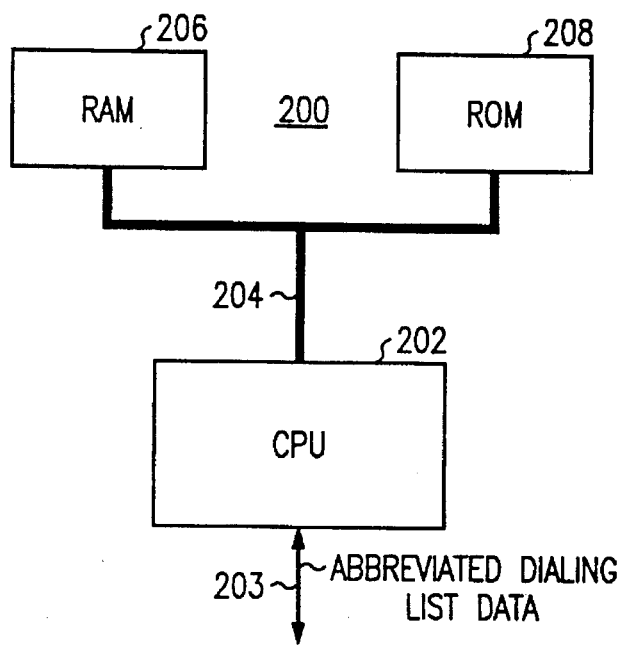
FIG. 2 is a block diagram of an electronic system for recording and processing telephone calls made from the telephone station according to aspects of the invention.

Referring now to FIG. 2, subsystem 200 is shown, which is pan of the apparatus 100. Subsystem 200 has a CPU 202 which collects data via bus 203 with respect to the DNs dialed by CPE 102, either manually or by abbreviated dialing. CPU 202 counts, sons and updates the DNs dialed by the CPE 102 to determine an abbreviated dialing list of the most frequently used DNs. After the data is processed by CPU 202, the resulting data is stored via memory bus 204 in RAM 206. The instructions for operating the CPU 202 to process, count, update and store this data regarding the DNs are contained in ROM 208 and/or in RAM 206. If these instructions are only in RAM 206, they have been loaded from some external device which is not shown.

The subsystem 200 is contained in CPE 102 in one embodiment of the invention, and subsystem 200 is contained in telecommunications switch 104 or in public switched network 110 in other embodiments of the invention. The method of determining an abbreviated dialing list may be performed by subsystem 200 in substantially the same manner independent of the subsystem's location. The embodiment having subsystem 200 contained in the CPE 102 has the capability to continuously read out and display the abbreviated dialing list determined by the method.

Figure 3:
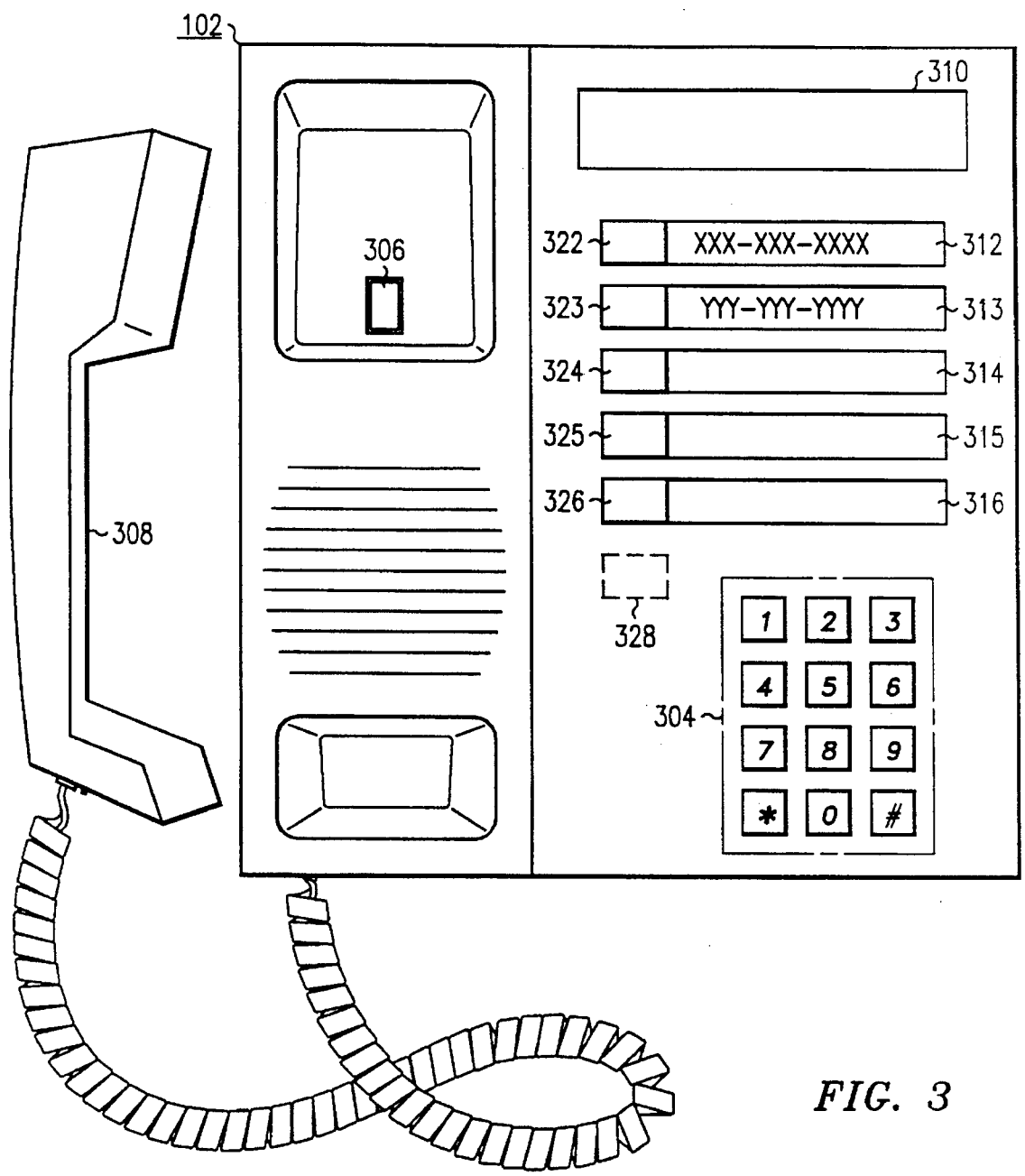
FIG. 3 is a pictorial view of a telephone station as it appears to a user.

Referring now to FIG. 3, an external view of CPE 102 is shown. CPE 102 has a keypad 304, which has keys for numbers 0 through 9, the asterisk (*) and the pound sign (#). Preferably, the keys of keypad 304 would generate DTMF signals, although the use of voice dialing and pulse dialing is also contemplated and is considered to be a modification within the scope of the present invention. CPE 102 also has a hook 306, which cradles handset 308 when the handset 308 is not being used. Hook 306 is spring loaded such that a switch (not shown) is closed and an off-hook signal is transmitted to telecommunications switch 104 whenever the handset 308 is lifted.

CPE 102 is shown with a general display 310 for displaying incoming caller identification, outgoing DN, time, date, status, or similar information, which is a very nice feature for the CPE 102 to have, but the method of the invention may be performed without the general display 310.

CPE 102 has displays 312, 313,314, 315 and 316 located adjacent to and logically associated with abbreviated dialing switches 322, 323,324, 325 and 326. The displays 312–316 may be liquid crystal displays, which are well known, or some other type of displays. The abbreviated dialing switches 322–326 may be meniscus switches or some other type, such as pressure or temperature sensitive switches, which are actuated by a human finger. Each of the displays 312–316 is individually addressable by the CPU 202 (shown in FIG. 2) in order to display an entry of an abbreviated dialing list. Similarly, each of the abbreviated dialing switches 322–326 has a respective address with which it is logically associated. Actuating any of the abbreviated dialing switches 322–326 results in an abbreviated dialing of the DN that appears in the respective display 312–316 that is adjacent to the actuated switch. If the CPU 202 (shown in FIG. 2) is located within the CPE 102, then the abbreviated dialing switches 322–326 would be connected to the CPU 202 via bus 203 and exchange data signals thereby. If the CPU 202 is located within the telecommunications switch 104 (shown in FIG. 1), then the abbreviated dialing switches 322–326 are connected via line 106 and bus 203 and exchange data signals that probably are encoded to indicated to the CPU 202 which DN has been selected for abbreviated dialing. If the CPU 202 is located within the public switched network 110 (shown in FIG. 1), then the abbreviated dialing switches 322–326 are connected through telecommunications switch 104 via lines 108 and 106 to bus 203 and exchange data signals that probably are encoded to indicated to the CPU 202 which DN has been selected for abbreviated dialing Only a limited number of abbreviated dialing displays 312–316 and abbreviated dialing switches 322–326 Will fit on CPE 102, for example five are shown in FIG. 3. More abbreviated dialing numbers may be displayed if a paging switch 328 is included as part of the CPE 102. By actuating the switch 328, a request is sent to the CPU 202 to display another page, i.e., the next set of DNs on the abbreviated dialing list. The simplest version of paging switch 328 is essentially a shift function where only a second page is displayed. Return to the top of the list may be effected by going on-hook and then off-hook again, or by having the paging roll over from the lowest displayable page of DNs from the abbreviated dialing list to the top most page of the abbreviated dialing list by a certain number of actuations of the paging switch 328. During paging of the displays 312–316, CPU 202 updates the associations between each of the abbreviated dialing switches 322–326 and the respective DN displayed adjacent to each abbreviated dialing switch.

Figure 4:
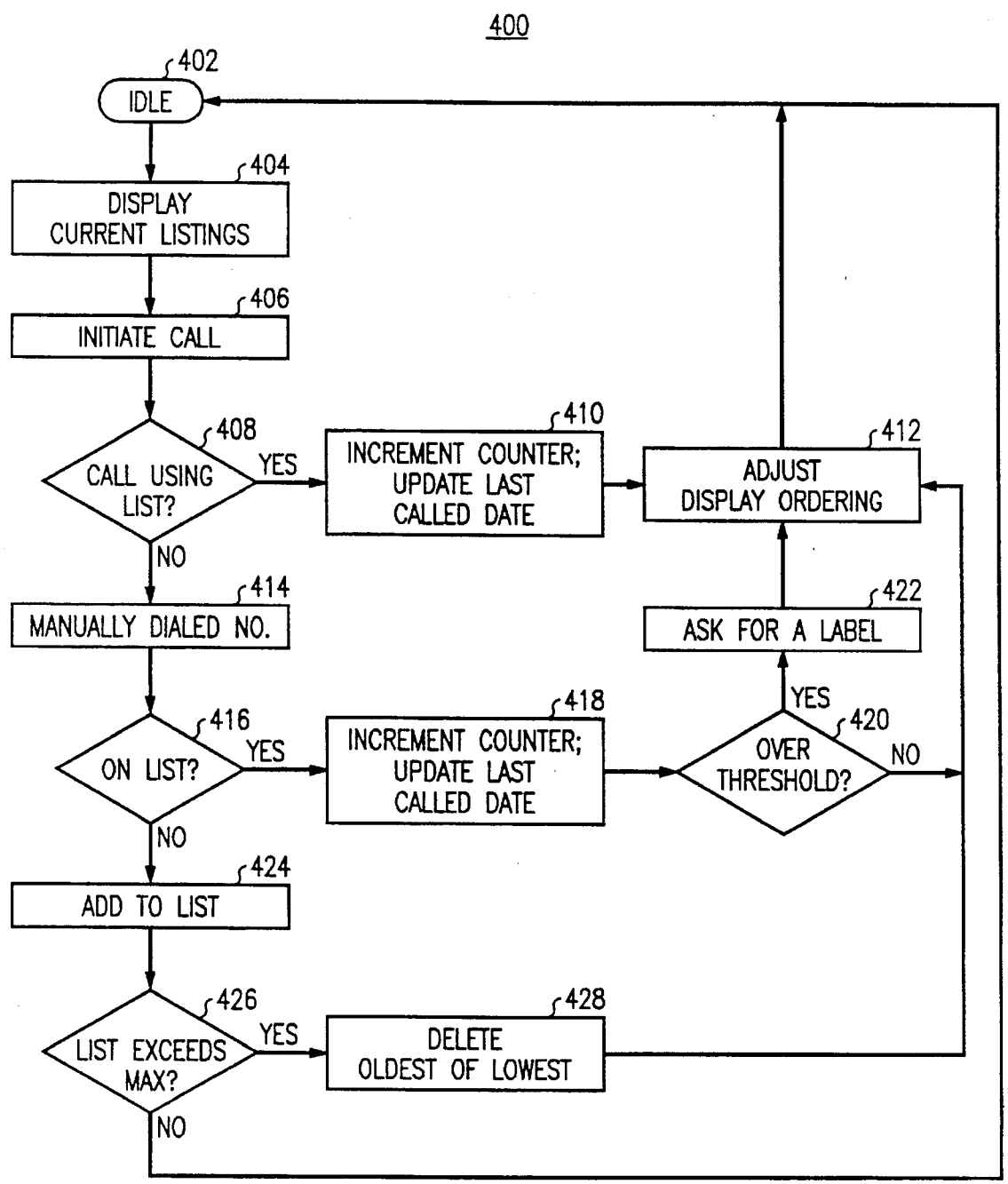
FIG. 4 is a flow diagram of a method for determining an abbreviated dialing list according to the invention.

Referring now to FIGS. 3 and 4, a logic flow diagram of a method 400 for determining an abbreviated dialing of the most frequently used DNs is shown and described. Method 400 begins with idle state 402, which corresponds to an on-hook state where CPE 102 is not being used and is idle. If the handset 308 is moved to the off-hook position, method 400 moves to action 404 where an off-hook signal is sent to CPU 202 (shown in FIG. 2) and CPU reads an abbreviated dialing list out of RAM 206 (also shown in FIG. 2), and the top most DN entries are displayed in displays 312–316. After the top DN entries are displayed, method 400 continues to action 406, where a call to another station is initiated. A user of CPE 102 may initiate a call in one of two ways: manually dialing or keying a DN or actuating one of the abbreviated dialing switches 322–326. After any dialing, either abbreviated or manual, is completed, method 400 continues to decision 408. Decision 408 determines if the latest call initiated at action 406 was by manual dialing or abbreviated dialing.

Figure 5:
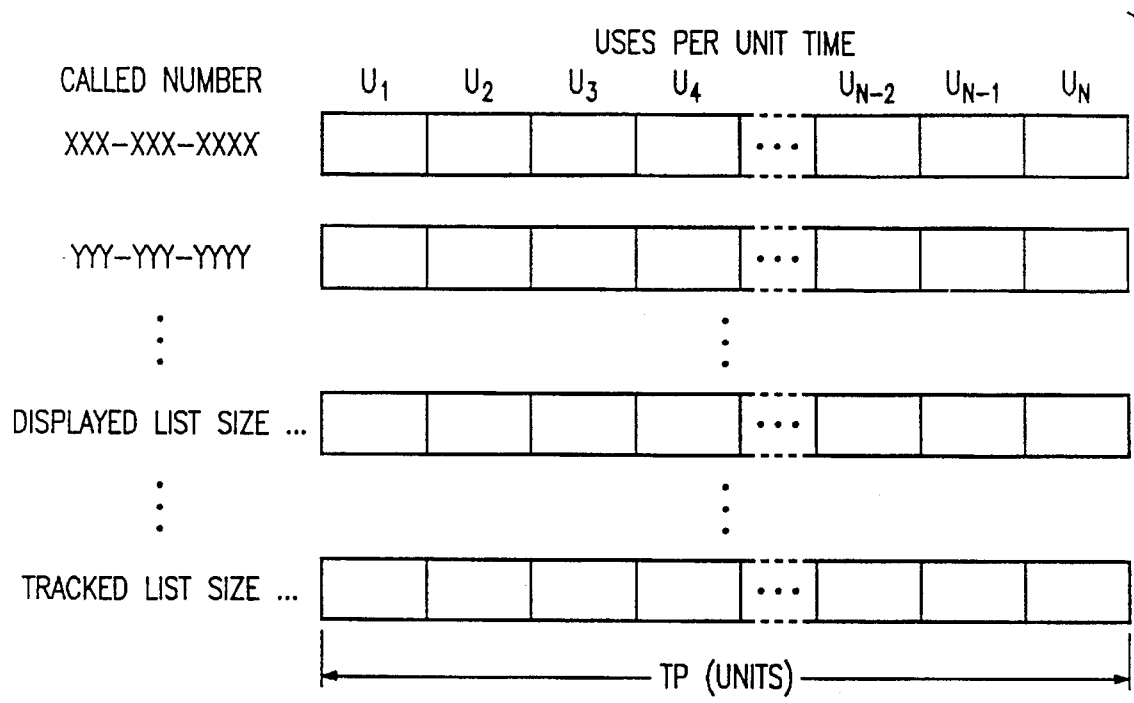
FIG. 5 illustrates an abbreviated dialing list that has been determined and its associated use data according to the invention.
Figure 6:
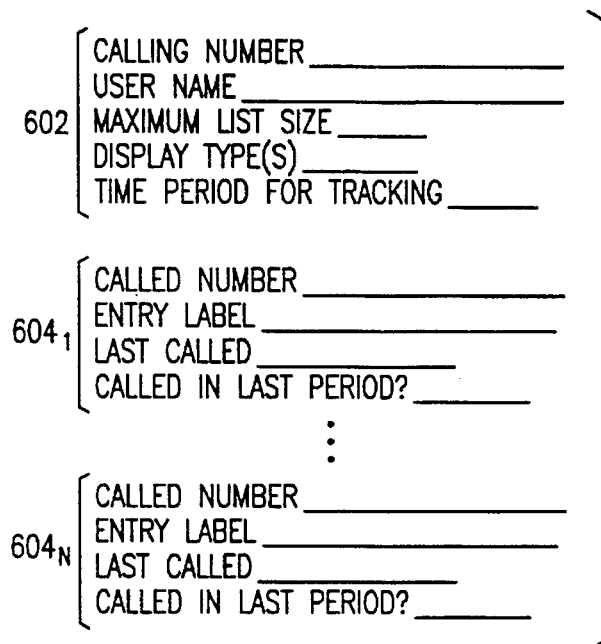
FIG. 6 illustrates the data that is gathered and stored as the basis for determining an abbreviated dialing list according to the invention.

For calls dialed by abbreviated dialing, method 400 proceeds to action 410. Action 410 increments a usage count of the number of times that this DN has been called. Also, the date of the call to this DN is stored. Data architectures for the data stored in RAM 206 (shown in FIG. 2) are shown in FIGS. 5 and 6. FIG. 5 illustrates that for each DN in the abbreviated dialing list the present invention stores counts of the uses per unit time. The unit of time $U_t$ could be an hour, a day, a week, a month, etc.; however, the preferred unit of time presently is the day. A sequence of these uses per unit time is recorded for a tracking period TP, which is selected by the user. For example, a tracking period of 28 days might be selected. In such a case, a count of the use each day of each DN on the abbreviated dialing list is stored. These use counts, for the example, are tracked for twenty-eight days. FIG. 6, illustrates further details of the data and data architecture stored to support an abbreviated dialing method and apparatus according to the present invention. Data set 602 is a record identification. This type of information is necessary when the CPU 202 that processes the data and the RAM 206 that stores the data are located at a distance from the CPE 102 from which the call is made, such as in a local switch or a key system controller. For such systems data set 602 can be used to retrieve the abbreviated dialing list from RAM 206. Each of the other data sets 6041 to 604N contain data specific to their respective DNs. The last called date and an activity indicator to indicate activity the previous 28 day time period are associated and stored with each respective DN, i.e., Called Number, of each entry on the abbreviated dialing list. Referring back to FIGS. 3 and 4, the respective last called date data is updated each time method 400 reaches action 410. After the count of the DN called is incremented at action 410, method 400 proceeds to action 412. At action 412, the number of calls to each DN for the selected time period is calculated and the entire abbreviated dialing list is sorted with respect to these totals with the DN for the highest usage, i.e., the most number of calls made during the time period will have the topmost position on the list and so forth. Ties in total calls will be broken in favor of the DN that has the most recent last called date. After action 412, some type of on-hook action must occur to end the call or place another, thus method 400 proceeds to idle 402.

If the determination at decision 408 is that the present call is not made using the abbreviated dialing list, the method 400 proceeds to action 414. Action 414 records the DN which was manually dialed and the method 400 proceeds to decision 416. Decision 416 determines if the manually dialed DN recorded is on the abbreviated dialing list or not. If the manually dialed DN is on the abbreviated dialing list, the method 400 proceeds to action 418. If the manually dialed DN is not on the abbreviated dialing list, the method 400 proceeds to action 424.

There are a number of reasons why a user would manually dial a DN which is on the abbreviated dialing list it could be a DN that is very well known to the user, so manually keying in the numbers is as fast as pressing the abbreviated dialing switches 322–326. The DN could be on a portion of the abbreviated dialing list that is not presently displayed, so manually dialing this DN is the most straight forward way of placing a call. Thus, method 400 can proceed to action 418.

Action 418 is very:similar to action 410 described above. The action 418 increments a usage count of the number of times that this DN has been called, just as action 410. Further, the dale of the call to this DN is stored, just as in action 410. The difference being that after action 418, method 400 proceeds to decision 420.

Decision 420 determines if the usage count for the present time period has exceeded a numerical threshold that operates as a dividing line between the frequently used DNs from the infrequently used DNs. If a DN exceeds the threshold, that DN has attained the status of a frequently called DN and the method 400 proceeds to action 422. At action 422, a database is accessed in order to obtain a label or name for this entry. If the CPU 202 (shown in FIG. 2) is located at a local telecommunications switch, the database could be any available to that switch. Since the method has the DN, retrieval of a label or name would be straight forward if the database is available. Alternatively, the label could be entered using two key sequences of keys on the keypad 304, or some similar coding scheme. After a label is obtained, it is associated with the DN and stored in RAM 206. After action 422, method 400 proceeds to action 412, which operates in the same manner as described previously to sort the abbreviated dialing list in order from most frequently called to least frequently called.

If decision 420 determines that the usage threshold of this DN has not been attained, method 400 proceeds to sorting action 412 without obtaining a label. It is worth noting that if labels are not required, decision 420 and action 422 could be omitted. If labels are used, they can optionally be displayed in CPE 102 on displays 312–316 instead of their respective DNs.

If decision 416 determines that the manually dialed number is not on the abbreviated dialing list, method 400 proceeds to action 424. Action 424 adds the manually dialed DN to the last position on the abbreviated dialing list. This is an essential step for the dynamically generated abbreviated dialing list since this is how a DN becomes listed in the first place. Method 400 proceeds to decision 426 from action 424. Decision 426 reads the maximum list size value stored in data set 602 (shown in FIG. 6) and compares the numerical ranking of the least frequently used DN. If these two values are the same, that means that the list has exceeded its maximum size, which at this point one more than maximum list size. If the list has exceeded its maximum size, method 400 proceeds to action 428. Action 428 deletes the oldest of the least frequently used DNs, if there are more than one, to limit the list to a desired size or memory limitation. Since actions 424-426-428 together make up the first step of becoming a frequently used DN, a new entry will very often be listed as the least frequent. To give a new entry a chance, action 428 may include some type of startup protection feature such as deleting the oldest of the least frequently used DNs which have been on the list for at least ten time units. This would give new entries to an existing list an opportunity to grow in usage before being replaced by the next new DN dialed. After action 428, method 400 proceeds to sorting action 412 described previously.

Empty data slots on the list may also be opened up by a housekeeping method (not shown) which simply checks the last usage of each entry on the list and deletes those entries which have had no activity for a set period of time, such as sixty days.

If decision 426 determines that the abbreviated dialing list has not exceeded its maximum size, then the list is still has room to grow and no deletion is necessary. In such a case, after this new manually dialed DN is added to the last position of the abbreviated dialing list, method 400 proceeds to idle state 402 without any sorting required. Thus, method 400 for determining an abbreviated dialing list is completed. Those in the art will recognize that the abbreviated dialing list is updated in some manner every time a DN is dialed or keyed from CPE 102. Thus, the abbreviated dialing list determined by the present invention always has the user's most frequently dialed numbers over the last time period.

Thus, it will now be understood that there has been disclosed a method and apparatus for a dynamically generated and maintained abbreviated dialing list. While the invention has been particularly illustrated and described with reference to preferred embodiments thereof, it will be understood by those skilled in the art that various changes in form, details, and applications may be made therein. For example, the processor and memory that process and maintain the abbreviated dialing list could also be located within a facsimile machine, a key telephone system, a local ISDN system, or an intelligent node of a local telecommunications network. It is accordingly intended that the appended claims shall cover all such changes in form, details and applications which do not depart from the true spirit and scope of the invention.

What is claimed is:

1. A method for dynamically determining a list of abbreviated dialing numbers for making a telephone call, comprising the steps of:

a. detecting a handset going off-hook;

b. after the handset is off-hook, reading a list of abbreviated dialing numbers from a memory;

c. displaying the topmost entries of the list of abbreviated dialing numbers;

d. determining if an abbreviated dialing selection is used to initiate the telephone call and if an abbreviated dialing selection was used, skipping ahead to step k, otherwise continuing to step e;

e. collecting a manually dialed number;

f. determining if the manually dialed number to the numbers is on the list of abbreviated dialing numbers and if it is on the list skipping to step l, otherwise continuing to step g;

g. adding the manually dialed number to the list;

h. determining if a number of entries of the list with the added manual dialed number exceeds a maximum number therefor and if the maximum number is not exceeded the method is completed, otherwise continuing to step i;

i. deleting an entry having the lowest usage other than the most recent manually dialed call and if there is a tie between entries for the lowest usage, deleting the lowest usage entry that is the least recent to be used from the list;

j. skipping ahead to step p;

k. updating a usage count value and a last used date for the dialed number, and skipping to step p;

l. updating usage count value and last used date for the dialed number;

m. determining if the usage count has exceeded a threshold as a possible displayed entry, and if the usage count has not exceeded the threshold then skipping to step p, otherwise continuing to step n;

n. requesting a label for this entry;

o. sorting the list from the entry having the most usage of its dialed number to the entry having the least usage; and p. storing the sorted list in said memory for use upon a next telephone call.

2. The method for dynamically determining a list of abbreviated dialing numbers for making a telephone call as set forth in claim 1, after step n and before step o, further comprising the step of storing the label for this entry in the memory.

3. A method for dynamically determining a list of abbreviated dialing numbers for making a telephone call, comprising the steps of:

a. detecting a handset going off-hook;

b. after the handset is off-hook, reading a list of abbreviated dialing numbers from a memory;

c. displaying the topmost entries of the list of abbreviated dialing numbers;

d. determining if an abbreviated dialing selection was used to initiate the telephone call and if an abbreviated dialing selection was used, skipping ahead to step k, otherwise continuing to step e;

e. collecting a manually dialed number;

f. determining if the manually dialed number to the numbers is on the list of abbreviated dialing numbers and if it is on the list skipping to step k, otherwise continuing to step g;

g. adding the manually dialed number to the list;

h. determining if a number of entries of the list with the added manual dialed number exceeds a maximum number therefor and if the maximum number is not exceeded the method is completed, otherwise continuing to step i;

i. deleting an entry having the lowest usage other than the most recent manually dialed call and if there is a tie between entries for the lowest usage, detecting the lowest usage entry that is the least recently used;

j. skipping ahead to step m;

k. updating a usage count value and a last used date for the dialed number;

l. sorting the list from the entry having the most usage of its dialed number to the entry having the least usage; and m. storing the sorted list in said memory for use upon a next telephone call.

4. A method for dynamically determining a list of abbreviated dialing numbers for making a telephone call, comprising the steps of:

a. detecting a handset going off-hook;

b. after the handset is off-hook, reading a list of abbreviated dialing numbers from a memory;

c. displaying the top-most entries of the list of abbreviated dialing numbers;

d. determining if an abbreviated dialing selection is used to initiate the telephone call and if an abbreviated dialing selection was used, skipping ahead to step k, otherwise continuing to step e;

e. collecting a manually dialed number;

f. determining if the manually dialed number to the numbers is on the list of abbreviated dialing numbers and if it is on the list skipping to step k, otherwise continuing to step g;

g. adding the manually dialed number to the list;

h. determining if a number of entries of the list with the added manual dialed number exceeds a maximum number therefor and if the maximum number is not exceeded the method is completed, otherwise continuing to step i;

i. deleting an entry having the lowest usage other than the most recent manually dialed call and if there is a tie between entries for the lowest usage, deleting the lowest usage entry that is the least recently used;

j. skipping ahead to step l;

k. updating a usage count value and a last used date for the dialed number, and l. storing the sorted list in said memory for use upon a next telephone call.

* * * * *

UNITED STATES PATENT AND TRADEMARK OFFICE
CERTIFICATE OF CORRECTION

PATENT NO. : 5,568,546
DATED : October 22, 1996
INVENTOR(S) : David J. Marutiak

It is certified that error appears in the above-identified patent and that said Letters Patent is hereby corrected as shown below:

Column 8, claim 3,
Line 11, delete "detecting" and insert -- deleting --.

Signed and Sealed this

Fourth Day of December, 2001

Attest:

NICHOLAS P. GODICI
Attesting Officer   Acting Director of the United States Patent and Trademark Office